United States Patent

[11] 3,585,447

| [72] | Inventor | William K. McLain<br>Orange County, Calif. |
|---|---|---|
| [21] | Appl. No. | 875,435 |
| [22] | Filed | Nov. 10, 1969 |
| [45] | Patented | June 15, 1971 |
| [73] | Assignee | Alice Richmond McLain<br>Orange County, Calif. |

[54] STATIC DISCHARGE APPARATUS
8 Claims, 5 Drawing Figs.

| [52] | U.S. Cl. | 317/2 |
|---|---|---|
| [51] | Int. Cl. | H05f 3/04,<br>B64d 45/02 |
| [50] | Field of Search | 317/2, 2.4 |

[56] References Cited
UNITED STATES PATENTS

| 2,536,818 | 1/1951 | Lawton | 317/2 |
|---|---|---|---|
| 3,034,020 | 5/1962 | Benkoczy et al. | 317/2 |
| 3,170,087 | 2/1965 | Tanner et al. | 317/2 |

Primary Examiner—Lee T. Hix
Attorneys—George J. Netter and Kendrick and Subkow

ABSTRACT: An elongated, low resistance, rodlike element has one end connected to an external aircraft part and its other end terminating in a spherical electrode. A relatively high resistance coating covers the rodlike element throughout a substantial part of its length from the connected end and terminates in a conductive brush electrode. High level static charge on the aircraft is dissipated via the spherical electrode, whereas low level charges are eliminated at the brush electrode.

PATENTED JUN 15 1971          3,585,447
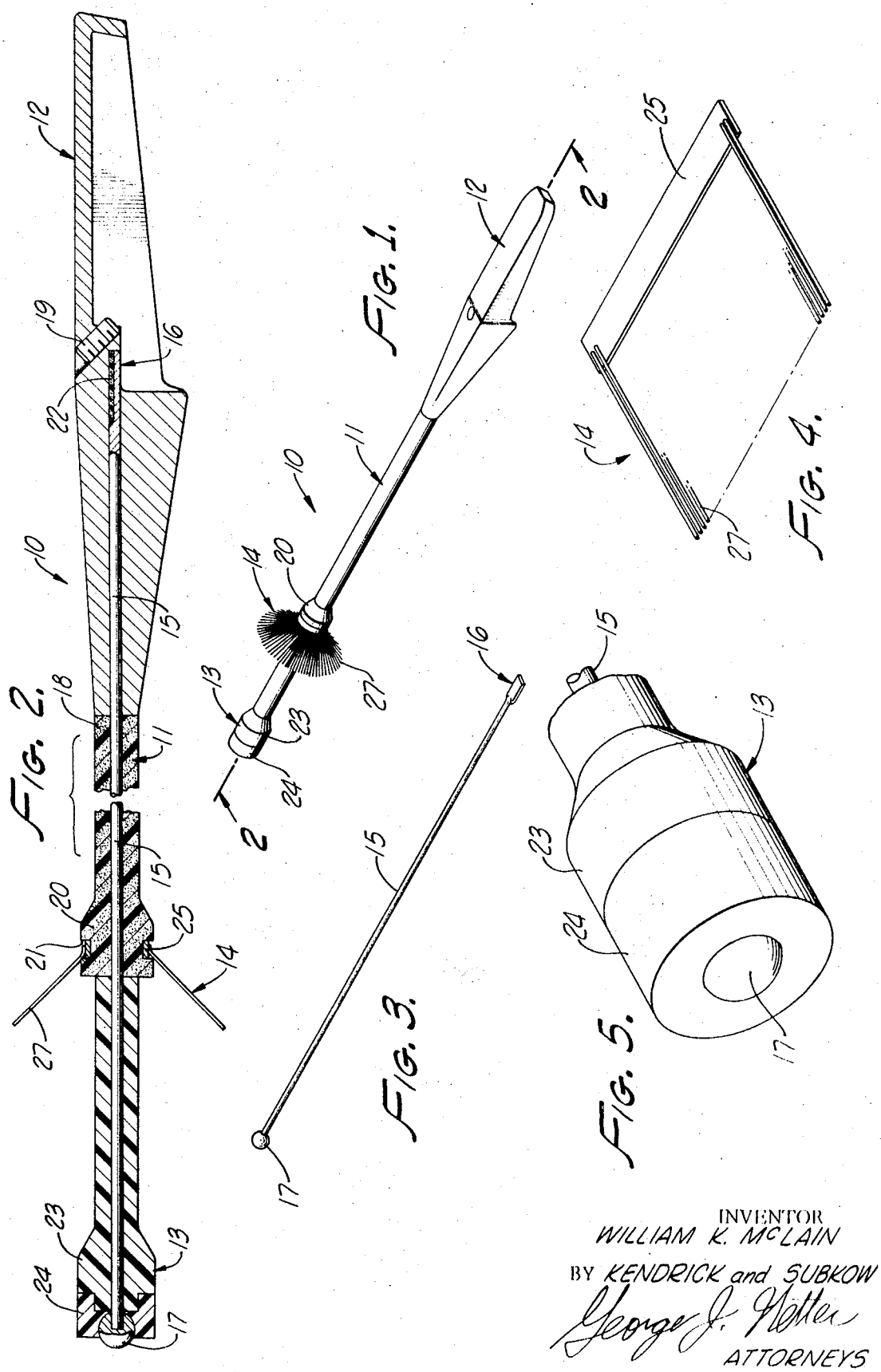
INVENTOR
WILLIAM K. MCLAIN
BY KENDRICK and SUBKOW
George J. Netter
ATTORNEYS

STATIC DISCHARGE APPARATUS

BACKGROUND OF THE INVENTION

The present invention relates generally to static discharge apparatus, and, more particularly, to such apparatus for use on aircraft and having high efficiency extended range discharge capability.

A continuing problem with aircraft is the necessity to eliminate static electric charge which develops on the aircraft during flight. Since air is an excellent insulator, it is conventional to use pointed electrodes which ionize the adjacent air to provide a dissipation path for accumulated charge. If removal of the charge is accomplished via a low resistance electrode path, high "fronts" are developed and radio communications can be significantly impaired. Accordingly, one approach in the past has been to construct a discharger having a brushlike outer termination and the connection of the brush to, say, an aircraft wing is made through a resistive element. Although this technique is satisfactory for lower discharge ranges (40 kilovolts or under), at much higher ranges (75 kilovolts or higher) these electrodes are usually destroyed, or the accumulated charge on the aircraft may be dissipated into the air along a path other than the discharger, which can damage the aircraft.

It is, therefore, a primary object of the present invention to provide static-discharging apparatus accomplishing improved electric charge neutralization over an extended range.

A further object is the provision of static-discharging apparatus exhibiting a relatively low resistance discharge path for high charge dissipation and a relatively high resistance discharge path for low charge dissipation.

A still further object is the provision of static-electric-discharging apparatus as described in the above objects which is relatively simple and inexpensive to manufacture.

Briefly, in accordance with the practice of this invention, an elongated, low resistance, rodlike element has one end connected to an external aircraft part and its other end terminating in a spherical electrode. A relatively high resistance coating covers the rodlike element throughout a substantial part of its length from the connected end and terminates in a conductive brush electrode. In operation, high level static charge on the aircraft is dissipated via the spherical electrode, whereas low level charges are eliminated at the brush electrode.

DESCRIPTION OF THE DRAWINGS

FIG. 1 is a perspective view of the static-discharging device of the present invention.

FIG. 2 is a longitudinal sectional view of the static-discharging device of FIG. 1 taken along line 2—2.

FIG. 3 is an elevational view of the high voltage discharge electrode shown disassembled from the device of FIG. 2.

FIG. 4 is a perspective depiction of the low voltage brush electrode of FIG. 1 shown prior to assembly.

FIG. 5 is a fragmentary, greatly enlarged view of the high voltage discharge member.

DESCRIPTION OF A PREFERRED EMBODIMENT

With reference now to the drawings and particularly to FIG. 1, the static-electricity-discharging device of the invention is enumerated as at 10 and is seen to include a generally elongate body 11, one end of which 12 is adapted for connection to, say, the trailing edge of an aircraft wing. A high voltage discharge member 13 is located at the other terminus of the body 11 and situated in a spaced relation therefrom is a low voltage discharge brush electrode 14, in a way that will be more particularly described herein, accumulated static charge on the aircraft below about 40 kv. will be dissipated via the brush electrode 14, and charge quantities exceeding that amount are eliminated via the electrode member 13. In this manner the static-discharging device of the invention readily neutralizes accumulated charge over a wide range without impairing the dissipation means in the case of a high charge accumulation, or generating more than a minimal number of arc discharges to interfere with radio communications.

In FIGS. 2 and 3 the static discharger 10 is seen to include a rodlike element 15 that extends throughout substantially the entire length of the device and has a flattened connection end 16 generally located in the region 12. The other rod extremity has affixed thereto a spherical electrode 17, which, as will be more clearly described later, serves as a high static charge dissipation means. Preferably, the rod 15 is constructed of an excellent electrical conductor such as brass or copper, for example.

A resistive sheath 18 surrounds a substantial part of the rod 15 and abuts in good electrical contact against the connection end 12 which is constructed of a metal having good strength and low electrical resistance properties. Although various ways of connection to the aircraft may be adopted and still be within the contemplation of this invention, a preferred manner is to provide a threaded opening 19, through which a machinescrew, for example, may be used to mount the device 10 to the aircraft.

The sheath 18 extends along the rod 15 somewhat past its midpoint and terminates in an enlarged hub or brush electrode mount 20. The mount 20 includes a continuous peripheral groove 21 for receiving the brush electrode. The sheath is constructed of a material having a relatively high electrical resistance as compared to that of the metal rod 15, e.g., 1.2 ohms/cubic centimeter. That is, whereas the electrical resistance from the rod end 16 to the sphere 17 is very low, the resistance from 16 through the sheath to the brush electrode must be considerably higher for proper operation of the invention. Although other materials may be found satisfactory, best results to date have been obtained with a sheath constructed of 50-percent carbon filled lacquer, which upon setting up, not only has the necessary electrical properties, but also has excellent abrasion resistance and good wearing properties. An excellent alternative resistive material for this purpose is 50-percent carbon filled epoxy.

In order to ensure good electrical contact between the flattened end 16 of rod 15 ad the connective end 12, the upper surface of the end 16 is provided with a layer 22 of 50-percent silver filled epoxy. By this instrumentality a continuous connection is maintained in use, despite subjection to high level vibrations and shock, nor will separation occur from either the metal of the rod end or the carbon-epoxy sheath over the normally wide range of thermal conditions to which the device is exposed.

The portion of the rod 15 beyond the brush mount 20 includes a continuous insulative coating 23 and a hollow cylindrical cap 24 fitting onto its extremity. Preferably, the coating 23 and cap 24 are constructed of a good electrically insulative plastic such as a polycarbonate, for example.

As shown best in FIG. 5, the cylindrical cap 24 is side notched or grooved as at 25 and is so dimensioned as to surround the spherical electrode 17, leaving but its outermost tip directly exposed to the atmosphere.

With simultaneous reference to FIGS. 2 and 4, the brush electrode 14 is seen to consist of an elongated, rectangular, metal strip 25 to which are secured a plurality of conductive brushes 27, extending normal to the long dimension of the strip and in the same direction. More particularly, the strip is preferably formed from relatively thin brass or copper stock and the brushes are brass wires, silver soldered to the strip. Alternatively, a number of other soft solders may be used as long as they do not contribute significantly to the electrical resistance of the brush electrodes.

Although the theory of operation of the present invention is not precisely known, it is believed that for charge accumulations of, say, 40 kilovolts and below, the resistive dissipation path via the brush electrode 14 is substantially the sole means for neutralizing the charge. Thus, the spherical electrode 17 is generally incapable, at the lower range of operation, of ionizing the atmosphere to thereby provide a path along the low resistive rod 15. However, as the accumulated charge increases substantially above the 40 kilovolt range and certainly at 75 kilovolts and above, the spherical electrode 17 is able to ionize the atmosphere molecules, thereby initiating charge dissipation along the low resistive path. Once dissipation is initiated along the low resistive path, the higher resistance path to the brush electrode is, in effect, switched off. In this manner, the discharger of this invention is able to operate throughout an extended charge range efficiently neutralizing accumulated charge on the aircraft without damaging the brush electrode for high charge neutralization.

What I claim is:

1. A static electric charge discharger comprising, in combination:
    first low resistance circuit means;
    second circuit means having an electrical resistance substantially larger than that of said first circuit means;
    means commonly interconnecting the first and second circuit means with the static electric charge; and
    first and second electrode means individually relating the respective first and second circuit means to a gaseous charge sink.

2. A device for discharging accumulated charge from a body to the atmosphere, comprising:
    means electrically connected to the charged body;
    a low ohmic member connected to the connection means;
    a relatively high resistance element connected to the connection means;
    first electrode means having a continuously curved termination disposed in the atmosphere, said electrode being connected to the low ohmic member; and
    second electrode means having at least one pointed termination disposed in the atmosphere, said second electrode means being connected to the high resistance element.

3. A device as in claim 2, in which the low ohmic member includes a metal rod, one end of which is connected to the connection means; and the first electrode means includes a curved smooth surfaced termination at the other end of the rod.

4. A device as in clam 3, in which the high resistance element includes a resistive coating over at least a part of the metal rod; and the second electrode means includes a plurality of wirelike elements.

5. A device as in claim 4, in which the resistive coating consists of lacquer including carbon particles.

6. A device as in claim 4, in which the resistive coating consists of an epoxy carrier including carbon particles.

7. An aircraft static charge discharging device, comprising, in combination:
    a rod of low ohmic material;
    means connected to one end of the rod for attachment to the aircraft;
    a rounded electrode connected to the other end of the rod;
    a resistive coating covering a portion of the intermediate reaches of said rod; and
    annular brush electrode means encircling the resistive coating and electrically connected therewith.

8. An aircraft static charge discharger as in claim 7, in which the annular brush electrode means includes a metal annulus, and a plurality of wirelike members having one end of each affixed to said annulus and extending from the same side thereof.